(12) United States Patent
Hoydis et al.

(10) Patent No.: US 11,750,436 B2
(45) Date of Patent: Sep. 5, 2023

(54) LEARNING IN COMMUNICATION SYSTEMS

(71) Applicant: Nokia Technologies Oy, Espoo (FI)

(72) Inventors: Jakob Hoydis, Paris (FR); Faycal Ait Aoudia, Saint-Cloud (FR); Maximilian Stark, Massy (FR)

(73) Assignee: Nokia Technologies Oy, Espoo, FL (US)

( * ) Notice: Subject to any disclaimer, the term of this patent is extended or adjusted under 35 U.S.C. 154(b) by 0 days.

(21) Appl. No.: 17/613,578

(22) PCT Filed: May 30, 2019

(86) PCT No.: PCT/EP2019/064146
§ 371 (c)(1),
(2) Date: Nov. 23, 2021

(87) PCT Pub. No.: WO2020/239232
PCT Pub. Date: Dec. 3, 2020

(65) Prior Publication Data
US 2022/0247614 A1    Aug. 4, 2022

(51) Int. Cl.
*H04L 27/34* (2006.01)
*H04L 25/02* (2006.01)
*H04L 25/03* (2006.01)

(52) U.S. Cl.
CPC ...... *H04L 27/3405* (2013.01); *H04L 25/0268* (2013.01); *H04L 25/03165* (2013.01);
(Continued)

(58) Field of Classification Search
CPC ............ H04L 27/3405; H04L 25/0268; H04L 25/03165; H04L 2025/03598;
(Continued)

(56) References Cited

U.S. PATENT DOCUMENTS 6,735,244 B1 * 5/2004 Hasegawa ......... H04L 25/03038
375/219
8,908,781 B2 * 12/2014 Cairns ................. H04L 27/0012
375/150
(Continued)

FOREIGN PATENT DOCUMENTS

WO    WO 2019/080987 A1    5/2019
WO    WO2019/080988 A1    5/2019

OTHER PUBLICATIONS

International Search Report & Written Opinion in International Application No. PCT/EP2019/064146 dated Mar. 4, 2020.
(Continued)

*Primary Examiner* — Don N Vo
(74) *Attorney, Agent, or Firm* — Lippes Mathias LLP

(57) ABSTRACT

An apparatus, method and computer program is described comprising: initialising trainable parameters of a transmission system having a transmitter, a channel and a receiver; generating training symbols on the basis of a differentiable distribution function; transmitting modulated training symbols to the receiver over the channel in a training mode; generating a loss function based on the generated training symbols and the modulated training symbols as received at the receiver of the transmission system; and generating updated parameters of the transmission system in order to minimise the loss function.

20 Claims, 6 Drawing Sheets

(52) U.S. Cl.
CPC ............... *H04L 2025/0377* (2013.01); *H04L 2025/03598* (2013.01)

(58) Field of Classification Search
CPC ......... H04L 2025/0377; H04L 25/0228; H04L 5/0048; H04L 25/0212; G06N 3/0481; G06N 3/084
USPC ...................................................... 375/262
See application file for complete search history.

(56) References Cited

U.S. PATENT DOCUMENTS

| | | | | |
|---|---|---|---|---|
| 2019/0198999 | A1* | 6/2019 | Ashrafi | ................ H01Q 25/04 |
| 2021/0027161 | A1* | 1/2021 | Hoydis | .................... G06N 3/04 |

OTHER PUBLICATIONS

Faycal Ait Aoudia et al, "End-to-End Learning of Communications Systems Without a Channel Model", arxiv.org, Cornell University Library, 201 Olin Library Cornell University Ithaca, NY 14853, Apr. 6, 2018 (Apr. 6, 2018), XP081431831, Sections I-IV; figures 1-3.

Faycal Ait Aoudia et al, "Model-free Training of End-to-End Communication Systems", arxiv.org, Cornell University Library, 201 Olin Library Cornell University Ithaca, NY 14853, Dec. 14, 2018 (Dec. 14, 2018), XP080993169, Sections II-IV; figures 1-5.

Sebastian Dorner et al, "Deep Learning-Based Communication Over the Air", arxiv.org, Cornell University Library, 201 Olin Library Cornell University Ithaca, NY 14853, Jul. 11, 2017 (Jul. 11, 2017), XP081279898, DOI: 10.1109/JSTSP.2017.2784180, Sections II-III; figures 1-3.

Eric Jang et al; "Categorical Reparameterization with Gumbel-Softmax", arxiv.org, Cornell University Library, 201 Olin Library Cornell University Ithaca, NY 14853, Nov. 3, 2016 (Nov. 3, 2016), XP080729237, Section 2.

Timothy J O'Shea et al, "An Introduction to Machine Learning Communications Systems", arxiv.org, Cornell University Library, 201 Olin Library Cornell University Ithaca, NY 14853, Feb. 2, 2017 (Feb. 2, 2017), XP080746465, Section II; figure 2.

* cited by examiner

LEARNING IN COMMUNICATION SYSTEMS

FIELD

The present specification relates to learning in communication systems.

BACKGROUND

A simple communications system includes a transmitter, a transmission channel, and a receiver. The choice of communication scheme used in the transmission of data from the transmitter to the receiver can have a significant impact of the end-to-end performance of such communications systems. Although developments have been made, there remains scope for further developments in this area.

SUMMARY

In a first aspect, this specification describes an apparatus comprising: means for initialising (e.g. randomly, or in some other way—such as on the basis of channel information) trainable parameters of a transmission system, wherein the transmission system comprises a transmitter, a channel and a receiver, wherein the transmitter includes a transmitter algorithm (e.g. implemented as a neural network) for converting one or more inputs (e.g. data bit(s) or a data stream) into one or more data symbols and a modulator for converting said data symbols into transmit symbols in accordance with a modulation scheme, wherein the trainable parameters of the transmission system include a probability function (e.g. implementing probabilistic shaping, as described herein) defining a probability that individual data symbols are output by the transmitter algorithm; means for generating training symbols on the basis of a distribution function, wherein the distribution function is differentiable; means for transmitting modulated training symbols to the receiver over the channel in a training mode; means for generating a loss function based on the generated training symbols and the modulated training symbols as received at the receiver of the transmission system; means for generating updated parameters of the transmission system (e.g. using machine learning principles, for example by updating a neural network) in order to minimise the loss function, wherein generating updated parameters of the transmission system comprise updating the parameters of the transmitter algorithm; and means for repeating the generating the training symbols, generating the loss function and updating parameters of the transmission system until a first condition is reached. The data symbols may be a finite and discrete set of symbols. The data symbols may correspond to constellation points of the transmitter. The probability function may be a discrete function that is not differentiable (and may be replaced by a differentiable approximation (the distribution function) during training). The generation of training symbols on the basis of a differentiable distribution function may enable the use of back-propagation during the training of parameters.

Updating the parameters of the training algorithm may include training the probability function. Updating said parameters may also include updating other parameters, such as the modulator constellation.

The distribution function may be an approximation of the probability function. For example, the distribution function may be a differentiable approximation of the probability function (which probability function may be discrete and non-differentiable).

The training symbols may be generated by a Gumbel-softmax algorithm, such as using Gumbel-softmax reparameterization.

The transmit symbols (and the training symbols in the training mode) may correspond to fixed constellation positions of a modulation scheme implemented by said modulator. Alternatively, the transmit symbols (and the training symbols in the training mode) may correspond to variable constellation positions of a modulation scheme implemented by said modulator, wherein the trainable parameters of the transmission system comprise constellation point positions of said modulation scheme.

The receiver may be configured to receive said transmit symbols as transmitted over said channel in an operational mode and to receive said modulated training symbols as transmitted over the channel in a training mode.

Generating updated parameters of the transmission system may comprise updating parameters of a trainable receiver algorithm. Thus, for example, end-to-end training of the transmission system may be provided.

Some embodiments may include means for updating the trainable parameters of the transmission system using the generated updated parameters of the transmission system. For example, the transmitter parameters may be updated in a training mode and then deployed to the transmitter algorithm. The trainable parameters of the transmitter system may comprise one of more of: trainable parameters of the transmitter algorithm; trainable parameters of the modulator; and trainable parameters of the receiver.

The probability function and the distribution function may be at least partially dependent on channel information (such as signal-to-noise ratio) of the transmission system.

In some embodiments, the first condition comprises a defined performance level. Alternatively, or in addition, the first condition may comprise a defined number of iterations.

The transmitter algorithm may be implemented as a look-up table in an operational mode.

The loss function may be related to one or more of block error rate, bit error rate, mutual information and categorical cross-entropy.

The means for generating updated parameters of the transmission system may optimise one or more of a batch size of symbol approximations used in the training mode and a learning rate.

The means for generating updated parameters of the transmission system may update said parameters using stochastic gradient descent (or some other backpropagation algorithm).

The transmitter may comprise a transmitter neural network configured to implement said transmitter algorithm. A receiver algorithm may include a receiver neural network.

The said means may comprise: at least one processor; and at least one memory including computer program code, the at least one memory and the computer program configured, with the at least one processor, to cause the performance of the apparatus.

In a second aspect, this specification describes a method comprising: initialising trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm; generating training symbols on the basis of a distribution function, wherein the distribution function is differentiable; transmitting modulated training symbols to the receiver over the channel in a training mode; generating a loss function based on the generated training symbols and the modulated training symbols as received at the receiver of the transmission system; generating updated parameters of the transmission system in order to minimise the loss function, wherein generating updated parameters of the transmission system comprise updating the parameters of the transmitter algorithm; and repeating the generating the training symbols, generating the loss function and updating parameters of the transmission system until a first condition is reached.

The training symbols may be generated by a Gumbel-softmax algorithm.

The transmit symbols may correspond to fixed constellation positions of a modulation scheme implemented by said modulator. Alternatively, the transmit symbols may correspond to variable constellation positions of a modulation scheme implemented by said modulator, wherein the trainable parameters of the transmission system comprise constellation point positions of said modulation scheme.

Generating the updated parameters of the transmission system may comprise updating parameters of a trainable receiver algorithm.

Some embodiments include updating the trainable parameters of the transmission system using the generated updated parameters of the transmission system. The said trainable parameters of the transmitter system may comprise one of more of: trainable parameters of the transmitter algorithm; trainable parameters of the modulator; and trainable parameters of the receiver.

The probability function and the distribution function may be at least partially dependent on channel information of the transmission system.

The second aspect may further comprise at least some of the features of the first aspect as described above.

In a third aspect, this specification describes an apparatus configured to perform any method as described with reference to the second aspect.

In a fourth aspect, this specification describes a work product comprising a look up table or array, created by means of the method of the second aspect.

In a fifth aspect, this specification describes computer-readable instructions which, when executed by computing apparatus, cause the computing apparatus to perform any method as described with reference to the third or fourth aspects.

In a sixth aspect, this specification describes a computer readable medium comprising program instructions stored thereon for performing at least the following: initialising trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm; generating training symbols on the basis of a distribution function, wherein the distribution function is differentiable; transmitting modulated symbol to the receiver over the channel in a training mode; generating a loss function based on the generated symbol and the modulated symbol as received at the receiver of the transmission system; generating updated parameters of the transmission system in order to minimise the loss function, wherein generating updated parameters of the transmission system comprise updating the parameters of the transmitter algorithm; and repeating the generating the symbol approximations, generating the loss function and updating parameters of the transmission system until a first condition is reached.

In an seventh aspect, this specification describes a computer program comprising instructions for causing an apparatus to perform at least the following: initialise trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm; generate training symbols on the basis of a distribution function, wherein the distribution function is differentiable; transmit modulated symbol to the receiver over the channel in a training mode; generate a loss function based on the generated symbol and the modulated symbol as received at the receiver of the transmission system; generate updated parameters of the transmission system in order to minimise the loss function, wherein generating updated parameters of the transmission system comprise updating the parameters of the transmitter algorithm; and repeat the generating the symbol approximations, generating the loss function and updating parameters of the transmission system until a first condition is reached.

In an eighth aspect, this specification describes an apparatus comprising: at least one processor; and at least one memory including computer program code which, when executed by the at least one processor, causes the apparatus to: initialise trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm; generate training symbols on the basis of a distribution function, wherein the distribution function is differentiable; transmit modulated symbol to the receiver over the channel in a training mode; generate a loss function based on the generated symbol and the modulated symbol as received at the receiver of the transmission system; generate updated parameters of the transmission system in order to minimise the loss function, wherein generating updated parameters of the transmission system comprise updating the parameters of the transmitter algorithm; and repeat the generating the symbol approximations, generating the loss function and updating parameters of the transmission system until a first condition is reached.

In a ninth aspect, this specification describes an apparatus comprising: a initialisation module for initialising (e.g. randomly, or in some other way—such as on the basis of channel information) trainable parameters of a transmission system, wherein the transmission system comprises a transmitter, a channel and a receiver, wherein the transmitter includes a transmitter algorithm (e.g. implemented as a neural network) for converting one or more inputs (e.g. data bit(s) or a data stream) into one or more data symbols and a modulator for converting said data symbols into transmit symbols in accordance with a modulation scheme, wherein the trainable parameters of the transmission system include a probability function (e.g. implementing probabilistic shaping, as described herein) defining a probability that individual data symbols are output by the transmitter algorithm; a training module (such as a shaping device) for generating training symbols on the basis of a distribution function, wherein the distribution function is differentiable; a transmitter for transmitting modulated training symbols to the receiver over the channel in a training mode; a processor for generating a loss function based on the generated training symbols and the modulated training symbols as received at the receiver of the transmission system; an updating module for generating updated parameters of the transmission system (e.g. using machine learning principles, for example by updating a neural network) in order to minimise the loss function, wherein generating updated parameters of the transmission system comprise updating the parameters of the transmitter algorithm; and a control module for repeating the generating the training symbols, generating the loss function and updating parameters of the transmission system until a first condition is reached. The data symbols may be a finite and discrete set of symbols. The data symbols may correspond to constellation points of the transmitter. The probability function may be a discrete function that is not differentiable (and may be replaced by a differentiable approximation (the distribution function) during training).

BRIEF DESCRIPTION OF THE DRAWINGS

Example embodiments will now be described, by way of non-limiting examples, with reference to the following schematic drawings, in which.

DETAILED DESCRIPTION

Figure 1:
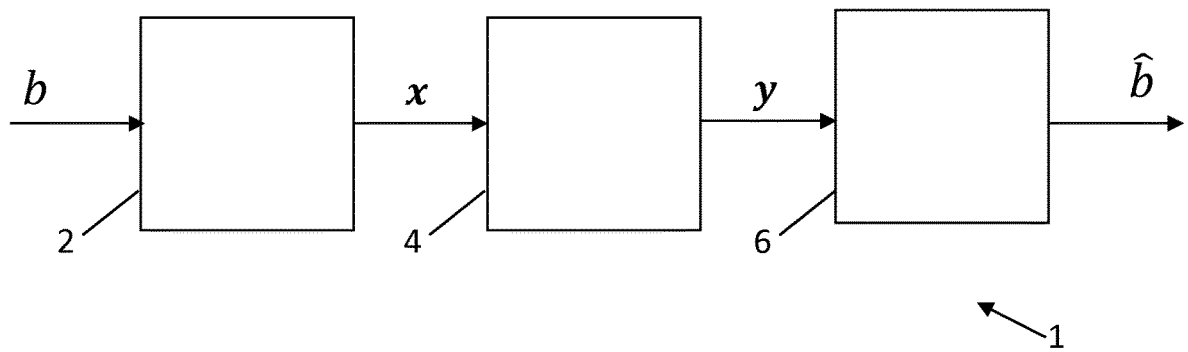
FIG. 1 is a block diagram of an example end-to-end communication system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example end-to-end communication system, indicated generally by the reference numeral 1, in accordance with an example embodiment. The system 1 includes a transmitter 2, a channel 4 and a receiver 6. Viewed at a system level, the system 1 converts input bits (b) received at the input to the transmitter 2 into output bits ($\hat{b}$) at the output of the receiver 6. More specifically, the transmitter 2 converts the input bits (b) into transmit symbols (x) for transmission over the channel 4 and the receiver 6 generates the output bits ($\hat{b}$) from symbols (y) received from the channel 4.

Figure 2:
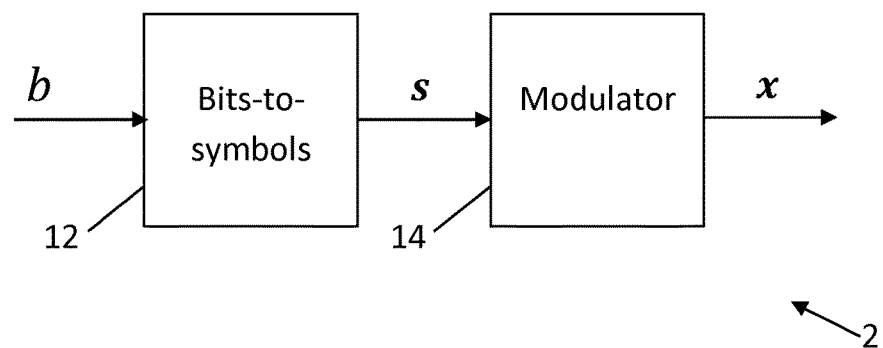
FIG. 2 is a block diagram of an example transmitter that may be used in the communication system of FIG. 1.

FIG. 2 is a block diagram of an example transmitter 2 that may be used in the communication system 1 described above. As shown in FIG. 2, the transmitter 2 includes a bit-to-symbols module 12 and a modulator 14. The bits-to-symbols module 12 receives the input data bits (b) and converts those bits into data symbols (s) for transmission. For example, the input data bits (b) may take the form of a data stream, which data stream is packaged for transmission by the bits-to-symbol module 12. The modulator 14 converts the data symbols into transmit symbols (x) in accordance with a modulation scheme. The transmit symbols are then transmitted over the channel 4 and received at the receiver 6 as received symbols (y).

Figure 3:
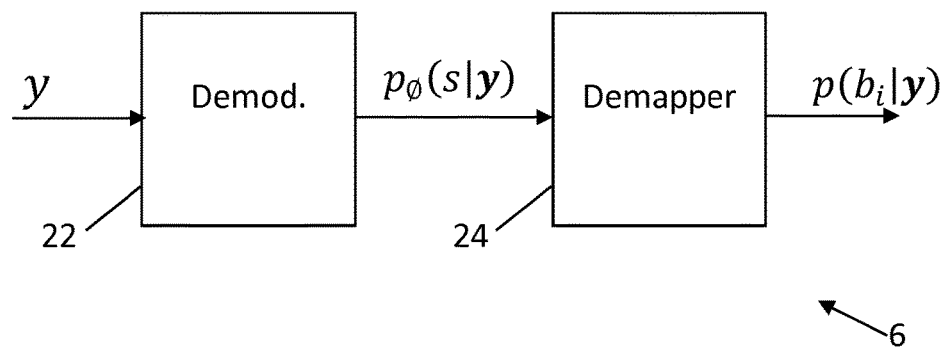
FIG. 3 is a block diagram of an example receiver that may be used in the communication system of FIG. 1.

FIG. 3 is a block diagram of an example receiver 6 that may be used in the communication system 1 described above. As shown in FIG. 3, the receiver 6 includes a demodulator 22 and demapper module 24. The demodulator 22 converts the received symbols (y) into symbol probabilities $p_\Theta(s|y)$ and the demapper 24 converts the symbol probabilities into bit probabilities $p(b_i|y)$.

A number of modulation techniques could be used in the implementation of the modulator 14 (and the demodulator 22). These include amplitude shift keying (ASK) in which the amplitude of a carrier signal is modified based on a signal being transmitted and phase shift keying (PSK) in which the phase of a carrier signal is modified based on a signal being transmitted. By way of example, quadrature phase shift keying (QPSK) is a form of phase shift keying in which two bits are modulated at once, selecting one of four possible carrier phases shifts (e.g. 0, +90 degree, 180 degrees, −90 degrees). Such carrier phase and amplitudes are often represented as constellation positions in a complex plane. The skilled person will be aware of many other suitable modulation techniques.

The choice of modulation scheme used to transmit information such as the communication system 1 has an impact on the end-to-end performance of such communication systems. Moreover, such modulation schemes may be optimised.

For communication schemes having multiple constellation points (such as amplitude and/or phase shift keying modulation schemes), the locations of such constellation points in a complex plane may be optimised. Alternatively, or in addition, the relative frequency with which such constellation points are used may be optimised. Those methods are referred to herein as geometric shaping and probabilistic shaping respectively.

Figure 4:
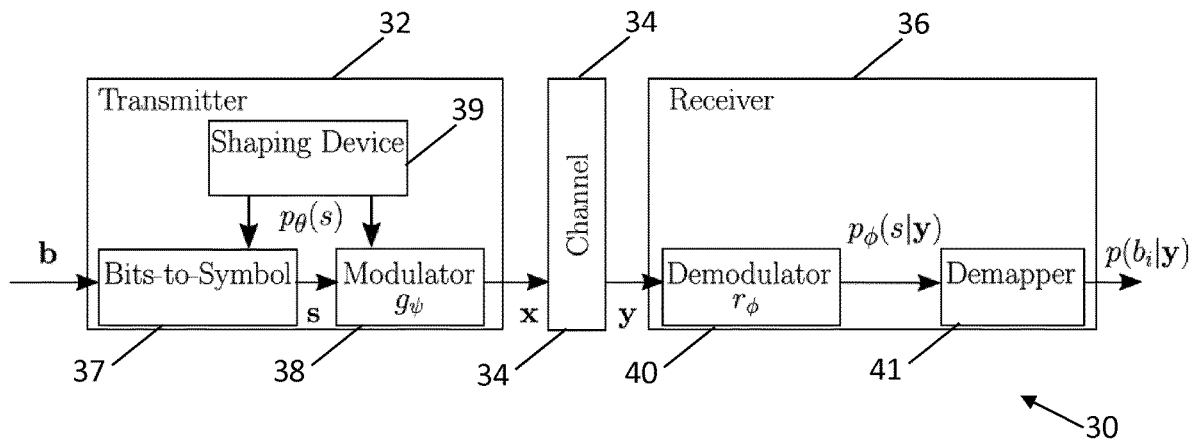
FIG. 4 is a block diagram of a transmission system in accordance with an example embodiment.

FIG. 4 is a block diagram of a transmission system, indicated generally by the reference numeral 30, in accordance with an example embodiment. The transmission system 30 comprises a transmitter 32, a channel 34 and a receiver 36 (that have some similarities with the transmitter 2, channel 4 and receiver 6 described above).

As shown in FIG. 4, the transmitter 32 comprises a bits-to-symbol module 37 (similar to the bits-to-symbol module 12 described above), a modulator 38 (similar to the modulator 14) and a shaping device 39. The receiver 36 comprises a demodulator 40 (similar to the demodulator 22) and a demapper module 41 (similar to the demapper module 24).

As discussed further below, the transmitter 32 maps an input stream of bits onto transmit symbols. The transmitter includes a neural network (or some other function with trainable parameters).

The bits-to-symbol module 37 receives an incoming bit sequence of size N, denoted by b=[$b_1$, ..., $b_N$], and maps that bit sequence onto hypersymbols s∈$\mathcal{S}$, such that the frequencies of occurrence of symbols s correspond to a probability distribution $p_\theta(s)$ provided by the shaping device 39. Here, $\mathcal{S}=\{1, \ldots, K\}$ is the finite and discrete set of hypersymbols. The hypersymbol s is provided to the modulator 38, which maps s onto complex transmit symbols x∈$\mathbb{C}^M$, where M is the number of channel uses.

The channel 34 of the system 30 takes the complex transmission symbols x∈$\mathbb{C}^M$ and outputs M received samples pooled in y∈$\mathbb{C}^M$. The possibly unknown transition probability p(y|x) describes the input-output relation of the channel 34.

The receiver 36 of the system 30 operates on the sequence y∈$\mathbb{C}^M$ of M samples generated by the channel 34. The demodulator 40 of the receiver 36 maps the received symbols onto symbol probabilities $p_\phi(s|y)$, and the demapper module 41 outputs bit probabilities $p(b_i|y)$.

Figure 5:
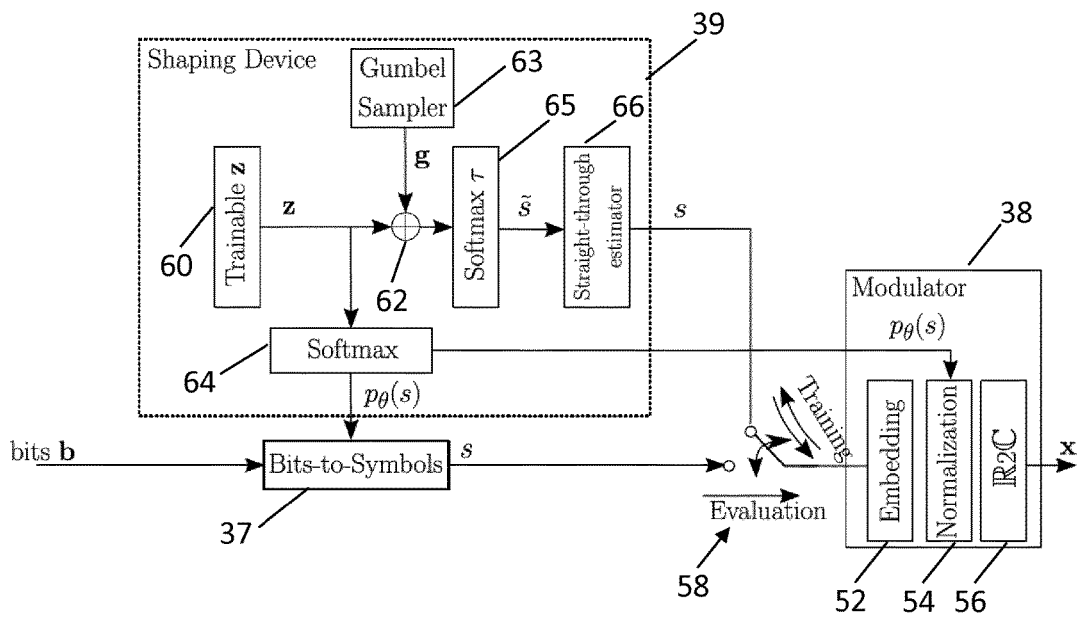
FIG. 5 is a block diagram of a transmitter in accordance with an example embodiment.

FIG. 5 is a block diagram of a transmitter, indicated generally by the reference numeral 50, in accordance with an example embodiment. The transmitter 50 is an example of the transmitter 32 described above; in particular, the transmitter 50 shows an example arrangement for training the transmitter 32 described above.

The transmitter 50 comprises the bits-to-symbol module 37, the modulator 38 and the shaping device 39 in accordance with an example embodiment. The shaping device 39 may be used during training of the transmitter 50. As described further below, in a normal operation mode, the shaping device 39 may be replaced, for example with a look-up-table providing the appropriate settings.

The modulator 38 comprises an embedding module 52, a normalization module 54 and real-to-complex conversion module 56. The shaping device 39 comprises a parameters module 60, a summing module 62, a Gumbel sampler 63, a softmax module 64, a softmax τ module 65 and a straight-through estimator 66.

The bits-to-symbol module 37 maps the incoming bits b onto the hypersymbols s. This mapping is implemented such that the frequency with which the symbols are used matches a given probability distribution $p_\theta(s)$. The probability distribution $p_\theta(s)$ is generated by the shaping module 39, as discussed further below.

The bits-to-symbols module 37 may be implemented in a number of ways. By way of example, a constant composition distribution matching (CCDM) approach may be used. CCDM involves mapping a vector of $N_1$ bits to a vector of $N_2$ symbols, where $N_1$ and $N_2$ are typically large numbers. From the set of all possible vectors of symbols of size $N_2$, one selects the ones such that symbols appear approximately with the desired target probabilities. These selected vectors form the set $\mathcal{G}$. The larger is $N_2$, the better is the approximation of the target probabilities. $N_1$ must be such that $N_1 \leq \log_2|\mathcal{G}|$. Then, one maps the vectors of bits of size $N_1$ to the vectors of symbols from g using arithmetic coding.

As discussed in detail below, it may be desired to train the system 50 using machine-learning principles, such as backpropagation. The operation performed by the bits-to-symbol module 37 is a discrete and non-differentiable function, and thus, many training techniques used in machine learning are not applicable.

The shaping device 39 may be implemented as a neural network with parameters θ (or any other trainable function). As suggested in FIG. 5, the shaping device 39 may make use of a straight-through Gumbel-softmax reparameterisation technique. The Gumbel-softmax technique states that samples s∈$\mathcal{S}$ of any discrete probability distribution $p_\theta(s)$ can be approximately sampled by:

Where (1)

$$\tilde{s} = \mathrm{softmax}\left(\frac{g+z}{\tau}\right)$$

$$\mathrm{softmax}(a) = \left[\frac{\exp a_i}{\sum_j \exp a_j}\right]_i \quad (2)$$

and $g_i$ with i∈$\mathcal{S}$ are samples from a Gumbel (0,1) distribution, and the $\{z_i\}$ with i∈$\mathcal{S}$ are the so-called logits (e.g. the logarithm of the unnormalised probabilities—the softmax function reverses this process) computed by a trainable neural network with parameters θ. (The parameter T is discussed further below.)

The distribution $p_\theta(s)$ can be retrieved from the logits by $p_\theta$=softmax(z). In the system 50, an example architecture of the neural network generating the logits is depicted. The logits are directly trained in the example, and therefore θ=z. Note that other architectures are possible. For example, the logits could be computer from channel information (such as signal-to-noise ratio) by a neural network.

By optimizing θ, one optimizes the distribution $p_\theta(s)$.

If the argmax operator were used instead of the softmax operator in the equation (1) above, this would enable sampling from the exact distribution $p_\theta(s)$. The argmax output would be converted to a one-hot representation, i.e., a vector with a single element set to one and the others set to zero. The index of the element set to one would correspond to the output of the argmax. However, the argmax operator is not differentiable, preventing the optimization of $p_\theta(s)$ by usual stochastic gradient descent (SGD) or similar backpropagation techniques. The softmax function may be used as a differentiable approximation of the argmax operator. The positive parameter T controls how largely the distribution of the generated samples $\tilde{s}$ deviates from the exact distribution $p_\theta(s)$. Setting τ to low values enables better approximation, but makes the training harder as it increases the sharpness of the softmax τ layer, making backpropagation of the gradient more difficult. A drawback of the softmax function is that it outputs only an approximation of one-hot vectors. To ensure that at training the input of the modulator is always a true one-hot vector, the output of the softmax may be fed into a straight-through estimator 66. A straight-through estimator is a very simple unit which discretizes its input to the closest truly one-hot vector (by setting its largest element equal to one and all other elements to zero), but can be skipped when performing backpropagation (i.e., the discretization is ignored).

Stochastic gradient descent seeks to optimize the trainable parameters based on backpropagating gradients. Since, in the arrangement described above, only the proposed sampling device but not the bits-to-symbols module 37 is trainable, different submodules are active at training and at deployment. This is depicted by the switch 58 in the system 50.

During training, the trainable shaping device 39 is active, and the hypersymbols s are generated by this device. In order to learn a distribution $p_\theta(s)$ that maximizes the information rate, the flow of backpropagating gradients is fed into the trainable device and the parameters θ are updated accordingly. Once training is complete, the learned distribution $p_\theta(s)$ is fed into the bits-to-symbols module 37 and the switch 58 is set to "evaluation". Thus, at deployment, the symbols are now generated by the bits-to-symbols module 37, which maps the incoming bit stream onto hypersymbols with the learned frequency $p_\theta(s)$. As noted above, such an arrangement may be implemented by a look-up-table or some similar module.

The modulator 38 maps the symbols s onto constellation points x in the complex plane. The actual location of these points can either be fixed or jointly optimized with $p_\theta(s)$. If the constellation is also learned, the modulator 38 can implemented as a neural network with trainable parameters (or any other learnable function), and denoted by $g_\psi$. An example architecture of a trainable modulator is shown in FIG. 5, which includes an embedding layer 52 of dimension K×2M and a normalization layer 54 that takes as a second input the learned distribution $p_\theta(s)$ to ensure some power constraint, e.g., $E\{\|x\|_2^2\}=M$. Finally, a real-to-complex conversion module 56 maps the 2M real outputs to M complex channel symbols. The skilled person will be aware of alternative implementations of the modulator 38 (particularly if the locations of the constellation points are fixed).

The systems 30 and 50 may be trained using end-to-end learning. With this approach, the transmitter 32, the channel 34 and the receiver 36 may be implemented as a single neural network, and the end-t0-end system trained to reconstruct the input(s) and the output. In some embodiments, a differential channel model may be assumed to be available. Alternative embodiments are possible, for example, in the event that no suitable channel model is available.

With end-to-end training, a trainable receiver $r_\varnothing$ with parameters Ø implemented as a neural network (or some other trainable function) may be provided.

Figure 6:
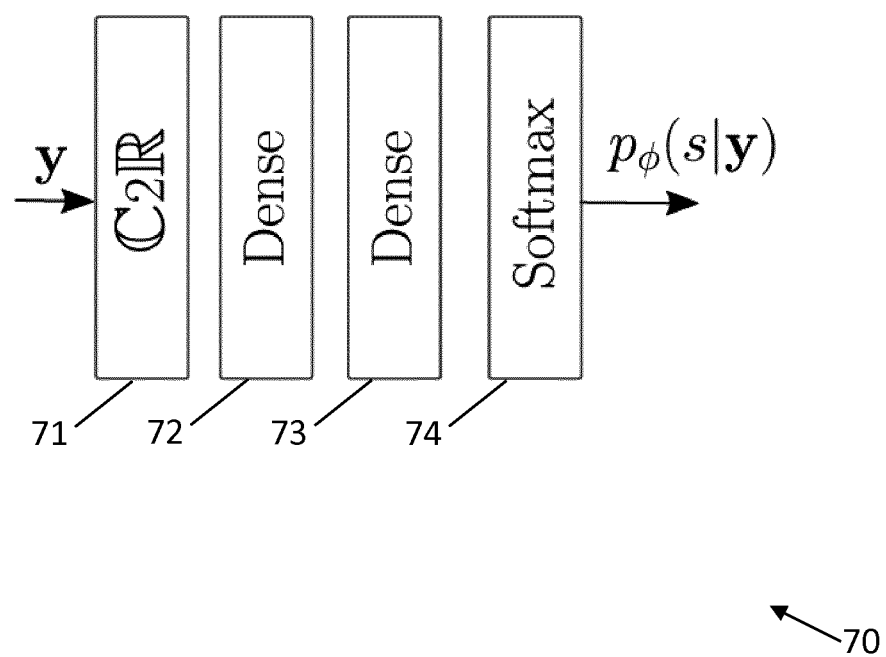
FIG. 6 is a block diagram of an example receiver module in accordance with an example embodiment.

FIG. 6 is a block diagram of an example receiver module, indicated generally by the reference numeral 70, in accordance with an example embodiment. The receiver module 70 comprises a complex-to-real conversion module 71, a first dense layer 72, a second dense layer 73 and a softmax layer 74. The provision of two dense layers in the system 70 is an example only; any number of dense layers could be provided.

The complex-to-real conversion module 71 converts a received vector $y \in \mathbb{C}^M$ into real values. This can be done, for example, by concatenating the real and imaginary parts of a sample to obtain a vector that takes values in $\mathbb{R}^{2M}$.

The so-obtained vector is fed provided to the dense layers 72 and 73, which dense layers may have different activation functions (e.g. ReLU, tanh, sigmoid, linear etc.). The softmax layer last layer has $|\mathcal{S}|$ output dimensions and leverages softmax activation functions to generate a discrete probability mass function $p_\phi(s|y)$, whose elements can be interpreted as the probability that the symbol s was transmitted.

To determine one or more of the trainable function θ (related to probabilistic shaping), φ (related to constellation positions or geometric shaping) and Ø (related to the receiver), stochastic gradient descent (or some similar algorithm) is performed. One possible loss function which could be minimised is the cross-entropy (CE) loss function to which is subtracted the symbols entropy:

$$\mathcal{L} = -E_{s\sim p_\theta(s), y\sim p(y|g_\psi(s))}\{\log p_\phi(s|y)\} + \Sigma_s p_\theta(s)\log p_\theta(s) \quad (3)$$

In the equation (3), the expectation is taken over all realisations of the symbols s and channel outputs y. Assuming independent and identically distributed (i.i.d.) realisations, the loss function can be estimated by:

$$\mathcal{L}(\theta, \varphi, \phi) \approx -\frac{1}{B}\sum_{i=1}^{B}\log p_\phi(s^{(i)}|y^{(i)}) + \sum_s p_\theta(s)\log p_\theta(s) \quad (4)$$

Where B denotes the batch size (i.e. the number of training examples used to approximate the loss). Note that optimisation would not be conducted over φ if the modulator is assumed to have fixed constellations.

Figure 7:
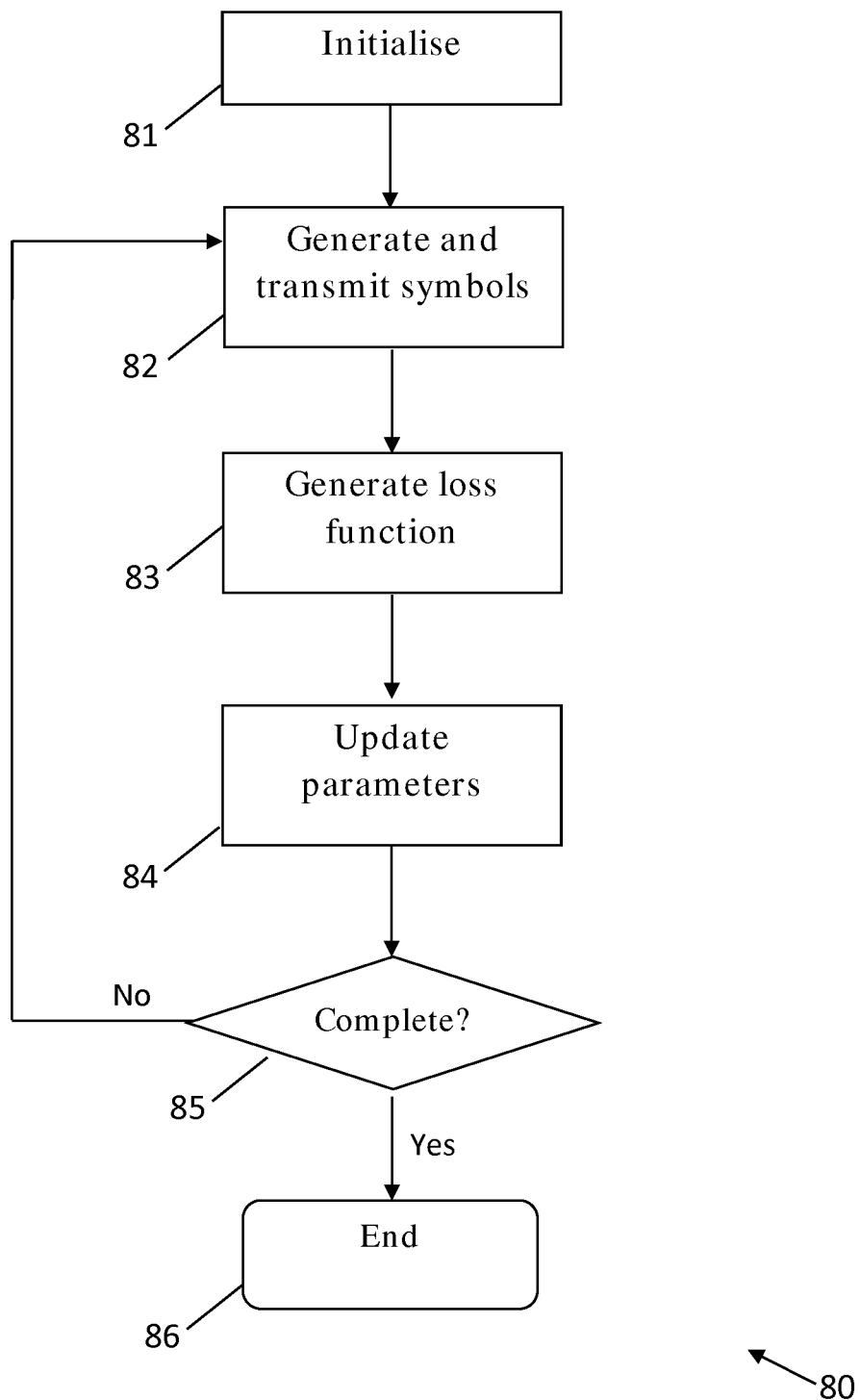
FIG. 7 is a flow chart showing an algorithm in accordance with an example embodiment.

FIG. 7 is a flow chart showing an algorithm, indicated generally by the reference numeral 80, in accordance with an example embodiment.

The algorithm 80 starts at operation 81, wherein trainable parameters of a transmission system (such as the transmission system discussed above with references to FIGS. 4 and 5) are initialised. The initialisation may take many forms, from example, the initialisation may set the trainable parameters randomly (or pseudo-randomly) or in some arbitrary way; alternatively, the trainable parameters may be set to a predefined starting point or defined according to some algorithm (e.g. on the basis of channel information of the transmission system, such as signal-to-noise ratio).

The initialisation of parameters may be implemented by the parameters module 60. The parameters module 60 may, for example, set an initial probability function defining a probability that individual data symbols (e.g. constellation points of the transmitter) are output by the transmitter algorithm. The probability function is a discrete function and is not directly differentiable.

The algorithm moves to operation 82, where training symbols are generated on the basis of a distribution function, wherein the distribution function is differentiable. The distribution function may be an approximation (e.g. a differentiable approximation) of the probability function. As noted above, the probability function is typically a discrete and non-differential probability function, which is not conducive to backpropagation techniques that are often employed in machine-learning processes (as discussed further below). Thus, a non-differentiable probability function may be replaced by a differential approximation during training.

The training symbols may be generated by a Gumbel-softmax algorithm (such as using Gumbel-softmax reparameterization discussed above). The training symbols, as generated by the shaping device 39 in the training mode, are provided to the modulator 38 and modulated training symbols are transmitted to the receiver 36 over the channel 34.

As discussed above, the training symbols (in the training mode) may correspond to fixed constellation positions of a modulation scheme implemented by the modulator 38. Similarly, the transmit symbols (in the normal operation mode) may correspond to fixed constellation positions.

Alternatively, the training symbols, in the training mode (and the transmit symbols in the normal operation mode) may correspond to variable constellation positions of a modulation scheme implemented by said modulator 38.

Moreover, the trainable parameters of the transmission system may comprise constellation point positions of said modulation scheme.

The symbols that are generated and transmitted over said channel in the operation 82 are received by the receiver 36.

At operation 83, a loss function is generated based on the generated training symbols and the modulated training symbols as received at the receiver of the transmission system. The loss function may take many different forms. For example, the loss function may be related to one or more of block error rate, bit error rate, mutual information and categorical cross-entropy.

At operation 84, the parameters of the transmission system are updated in order to minimise the loss function, wherein generating updated parameters of the transmission system comprise updating the parameters of the transmitter algorithm (e.g. using machine-learning principles, for example by updating a neural network). Generating updated parameters of the transmission system may include training the probability function discussed above. Thus, for example, the probability function may be trained in order to set the probabilistic shaping such that the bit error rate (or some other error function) is minimised. Other parameters may also be updated, such as the modulator constellation positions.

In addition to updating the trainable transmitter algorithm, generating updated parameters of the transmission system in the operation 84 may comprise updating parameters of a trainable receiver algorithm (thereby implementing end-to-end training of the transmission system).

At operation 85, it is determined whether the algorithm 80 is complete. If so, the algorithm terminates at operation 86; otherwise, the algorithm returns to operation 82 such that the operations 82 to 85 are repeated (i.e. the generating and transmitting of training symbols, the generating a loss function and updating of parameters of the transmission system are repeated).

The algorithm may be deemed to be complete (at operation 85) when a condition is reached. Such a condition may take many forms. For example, the operations 82 to 85 may be repeated until a defined performance level is reached. Alternatively, or in addition, the operations 82 to 85 may be repeated until a defined number of iterations has been completed.

It should also be noted that the batch size B of symbol approximations used in the training made and/or the learning rate (and possibly other parameters of the chosen SGD variant, e,g, ADAM, RMSProp, Momentum) could be optimization parameters of the algorithm 80.

Once trained, the trainable parameters of the transmission system may be deployed. This may involve updating the trainable parameters of the transmission system using the generated updated parameters of the transmission system. Moreover, the trainable parameters of the transmitter system may comprise one of more of: trainable parameters of the transmitter algorithm, trainable parameters of the modulator and trainable parameters of the receiver.

A number of modifications to the example embodiments described above are possible. For example, end-to-end training of the transmission systems 30 and 50 could be performed without knowledge of the relevant channel mode, and without requiring a differentiable channel mode, by leveraging principles of reinforcement learning. Moreover, a differential channel model could be learned using the principles of generative adversarial networks. Once such a model has been learned, end-to-end learning could be performed using the learned channel model as a differentiable channel model.

Figure 8:
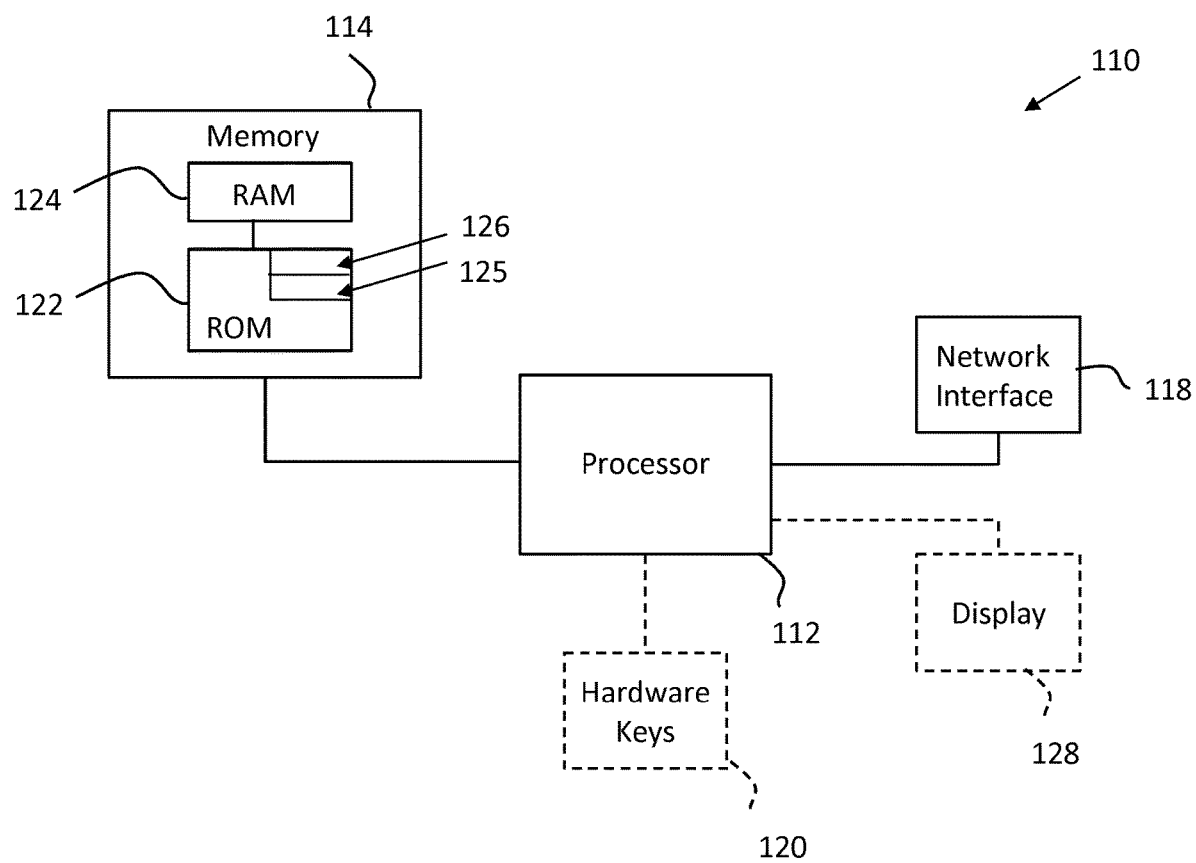
FIG. 8 is a block diagram of a components of a system in accordance with an exemplary embodiment.

For completeness, FIG. 8 is a schematic diagram of components of one or more of the modules described previously (e.g. the transmitter or receiver neural networks), which hereafter are referred to generically as processing systems 110. A processing system 110 may have a processor 112, a memory 114 closely coupled to the processor and comprised of a RAM 124 and ROM 122, and, optionally, hardware keys 120 and a display 128. The processing system 110 may comprise one or more network interfaces 118 for connection to a network, e.g. a modem which may be wired or wireless.

The processor 112 is connected to each of the other components in order to control operation thereof.

The memory 114 may comprise a non-volatile memory, a hard disk drive (HDD) or a solid state drive (SSD). The ROM 122 of the memory 114 stores, amongst other things, an operating system 125 and may store software applications 126. The RAM 124 of the memory 114 is used by the processor 112 for the temporary storage of data. The operating system 125 may contain code which, when executed by the processor, implements aspects of the algorithm 80.

The processor 112 may take any suitable form. For instance, it may be a microcontroller, plural microcontrollers, a processor, or plural processors.

The processing system 110 may be a standalone computer, a server, a console, or a network thereof.

In some embodiments, the processing system 110 may also be associated with external software applications. These may be applications stored on a remote server device and may run partly or exclusively on the remote server device. These applications may be termed cloud-hosted applications. The processing system 110 may be in communication with the remote server device in order to utilize the software application stored there.

Figure 9A:
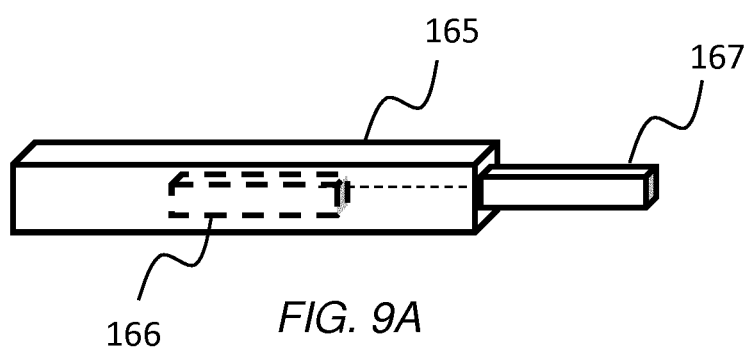
FIGS. 9a and 9b show tangible media, respectively a removable memory unit and a compact disc (CD) storing computer-readable code which when run by a computer perform operations according to embodiments.
Figure 9B:
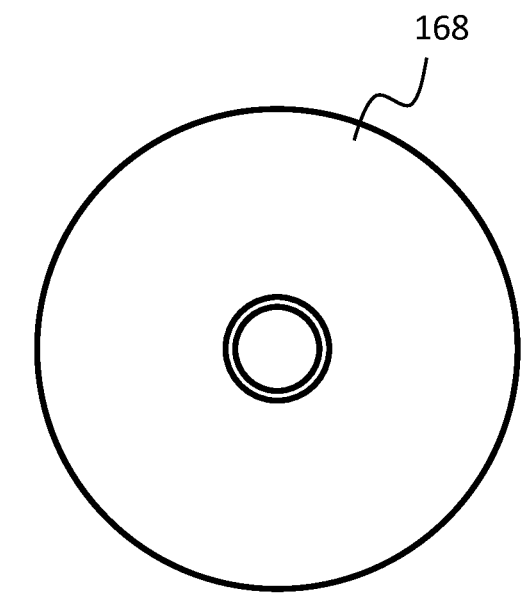

FIGS. 9A and 9B show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 7 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code, the at least one memory and the computer program configured, with the at least one processor, to cause the apparatus to perform at least:
   initialising trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm;
   generating training symbols on the basis of a distribution function, wherein the distribution function is differentiable;
   transmitting modulated training symbols to the receiver over the channel in a training mode;
   generating a loss function based on the generated training symbols and the modulated training symbols as received at the receiver of the transmission system;
   generating updated parameters of the transmission system in order to minimise the loss function, wherein generating updated parameters of the transmission system comprise updating the parameters of the transmitter algorithm; and
   repeating the generating the training symbols, generating the loss function and updating parameters of the transmission system until a first condition is reached.

2. The apparatus as claimed in claim 1, wherein the distribution function is an approximation of the probability function.

3. The apparatus as claimed in claim 1, wherein the training symbols are generated by a Gumbel-softmax algorithm.

4. The apparatus as claimed in claim 1, wherein said transmit symbols correspond to fixed constellation positions of a modulation scheme implemented by said modulator.

5. The apparatus as claimed in claim 1, wherein said transmit symbols correspond to variable constellation positions of a modulation scheme implemented by said modulator, wherein the trainable parameters of the transmission system comprise constellation point positions of said modulation scheme.

6. The apparatus as claimed in claim 1, wherein the receiver is configured to receive said transmit symbols as transmitted over said channel in an operational mode and to receive said modulated training symbols as transmitted over the channel in a training mode.

7. The apparatus as claimed in claim 1, wherein generating updated parameters of the transmission system comprises updating parameters of a trainable receiver algorithm.

8. The apparatus as claimed in claim 1, wherein the at least one processor, with the at least one memory and the computer program code, is arranged to cause the apparatus to further perform:
   updating the trainable parameters of the transmission system using the generated updated parameters of the transmission system.

9. The apparatus as claimed in claim 8, wherein the trainable parameters of the transmitter system comprise one of more of: trainable parameters of the transmitter algorithm; trainable parameters of the modulator; and trainable parameters of the receiver.

10. The apparatus as claimed in a claim 1, wherein the probability function and the distribution function are at least partially dependent on channel information of the transmission system.

11. The apparatus as claimed in claim 1, wherein the first condition comprises a defined performance level.

12. The apparatus as claimed in claim 1, wherein the first condition comprises a defined number of iterations.

13. The apparatus as claimed in claim 1, wherein said transmitter algorithm is implemented as a look-up table in an operational mode.

14. The apparatus as claimed in claim 1, wherein the loss function is related to one or more of block error rate, bit error rate, mutual information and categorical cross-entropy.

15. The apparatus as claimed in a claim 1, wherein generating updated parameters of the transmission system optimises one or more of a batch size of symbol approximations used in the training mode and a learning rate.

16. The apparatus as claimed in claim 1, wherein generating updated parameters of the transmission system updates said parameters using stochastic gradient descent.

17. The apparatus as claimed in claim 1, wherein the transmitter comprises a transmitter neural network configured to implement said transmitter algorithm.

18. A method comprising:
    initialising trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm;
    generating training symbols on the basis of a distribution function, wherein the distribution function is differentiable;
    transmitting modulated training symbols to the receiver over the channel in a training mode;
    generating a loss function based on the generated training symbols and the modulated training symbols as received at the receiver of the transmission system;
    generating updated parameters of the transmission system in order to minimise the loss function, wherein generating updated parameters of the transmission system comprise updating the parameters of the transmitter algorithm; and
    repeating the generating the training symbols, generating the loss function and updating parameters of the transmission system until a first condition is reached.

19. A method as claimed in claim 18, wherein:
    said transmit symbols correspond to fixed constellation positions of a modulation scheme implemented by said modulator; or
    said transmit symbols correspond to variable constellation positions of a modulation scheme implemented by said modulator, wherein the trainable parameters of the transmission system comprise constellation point positions of said modulation scheme.

20. A non-transitory computer readable medium comprising instructions that, when executed by an apparatus, cause the apparatus to at least:
    initialise trainable parameters of a transmission system, wherein the transmission system comprises a transmitter, a channel and a receiver, wherein the transmitter includes a transmitter algorithm for converting one or more inputs into one or more data symbols and a modulator for converting said data symbols into transmit symbols in accordance with a modulation scheme, wherein the trainable parameters of the transmission system include a probability function defining a probability that individual data symbols are output by the transmitter algorithm;
    generate training symbols on the basis of a distribution function, wherein the distribution function is differentiable;
    transmit modulated symbol to the receiver over the channel in a training mode;
    generate a loss function based on the generated symbol and the modulated symbol as received at the receiver of the transmission system;
    generate updated parameters of the transmission system in order to minimise the loss function, wherein generating updated parameters of the transmission system comprise updating the parameters of the transmitter algorithm; and
    repeat the generating the symbol approximations, generating the loss function and updating parameters of the transmission system until a first condition is reached.

* * * * *